US 8,266,160 B2

(12) United States Patent
Listou

(10) Patent No.: US 8,266,160 B2
(45) Date of Patent: Sep. 11, 2012

(54) COMPUTER-AIDED MORPHOLOGICAL ANALYSIS OF DATA ITEMS

(75) Inventor: Robert Eugene Listou, Falls Church, VA (US)

(73) Assignee: Execware, LLC, Falls Church, VA (US)

( * ) Notice: Subject to any disclaimer, the term of this patent is extended or adjusted under 35 U.S.C. 154(b) by 0 days.

(21) Appl. No.: 13/216,834

(22) Filed: Aug. 24, 2011

(65) Prior Publication Data

US 2011/0307774 A1    Dec. 15, 2011

Related U.S. Application Data

(63) Continuation of application No. 12/369,070, filed on Feb. 11, 2009, now Pat. No. 8,010,549, and a continuation-in-part of application No. 12/699,973, filed on Feb. 26, 2010, now Pat. No. 8,060,819.

(51) Int. Cl.
    *G06F 17/30* (2006.01)
(52) U.S. Cl. ........ 707/752; 707/761; 707/741; 715/227; 715/236
(58) Field of Classification Search ................. 707/752, 707/693, 741, 760, 761; 715/744, 227, 259, 715/273, 236
See application file for complete search history.

(56) References Cited

U.S. PATENT DOCUMENTS

| | | | | |
|---|---|---|---|---|
| 5,844,554 A | * | 12/1998 | Geller et al. | 715/744 |
| 6,125,182 A | * | 9/2000 | Satterfield | 380/28 |
| 6,441,601 B1 | * | 8/2002 | Clark et al. | 324/76.52 |
| 2010/0205185 A1 | * | 8/2010 | Listou | 707/752 |
| 2011/0307774 A1 | * | 12/2011 | Listou | 715/227 |
| 2012/0079362 A1 | * | 3/2012 | Listou | 715/227 |
| 2012/0159304 A1 | * | 6/2012 | Listou | 715/227 |

* cited by examiner

*Primary Examiner* — Jean M Corrielus
(74) *Attorney, Agent, or Firm* — Tarek N. Fahmi, APC

(57) ABSTRACT

Improvements to computer-aided methodology of morphological analysis of a set of text data objects and associated graphic images. The methodology, named contextual data modeling (CDM), involves personal discovery of meaningful interrelations of parametric values and names of text data objects using automated permutation of a data table; plus viewing for each item listed on the table an integrated dialog box (item screen), containing the item's parametric data and other data; plus concurrent and coordinated display of the data table and graphic images associated with items on the data table. Near real time operation optimizes retention of perceived data in the computer user's short term working memory as reasoning leads to modeling (manipulating) the data, including editing and colorization, until the user's reasoning is reflected in the displayed data.

20 Claims, 5 Drawing Sheets

| Material | Color | Object | Grid | Depth | Item |
|---|---|---|---|---|---|
| Clay | Black | Plate | 19 | 18 | 17 |
| Clay | Black | Plate | 19 | 18 | 16 |
| Clay | Blue | Bowl | 8 | 5 | 12 |
| Clay | Blue | Pitcher | 21 | 15 | 4 |
| Clay | Blue | Plate | 18 | 5 | 15 |
| Clay | Brown | Box | 23 | 12 | 2 |
| Clay | Gray | ?? | 10 | 19 | 23 |
| Clay | Gray | Bowl | 17 | 4 | 14 |
| Clay | Gray | Bowl | 22 | 15 | 1 |
| Clay | Gray | Platter | 20 | 13 | 11 |
| Clay | Green | Bowl | 19 | 9 | 13 |

FIG. 1

COMPUTER-AIDED MORPHOLOGICAL ANALYSIS OF DATA ITEMS

CROSS-REFERENCE TO RELATED APPLICATIONS

This application is a CONTINUATION of U.S. patent application Ser. No. 12/369,070, filed Feb. 11, 2009, now U.S. Pat. No. 8,010,549 incorporated herein by reference, and a CONTINUATION-IN-PART of U.S. patent application Ser. No. 12/699,973 filed Feb. 26, 2010 now U.S. Pat. No. 8,060,819.

FIELD OF THE INVENTION

This invention relates to the field of information processing and display by computers, particularly to an analytic methodology which the present inventor refers to as contextual data modeling (CDM).

BACKGROUND OF THE INVENTION

CDM is a systemized form of computer-aided morphological analysis that deals with concrete items in an orderly way in which no interrelations of the names and parameter values of text data objects on a data table are ignored a priori as being unimportant. Text data items analyzed using CDM include any type of objects or events with unique identifying names or numbers plus parameters such as weight, nationality, material, location, date, age, etcetera. It will be apparent that "things" or "items" exist in many fields of investigation, analysis, and research that can be listed in data tables and that many interrelations are possible. The objective of CDM is to discover all of the interrelations and assess their merit in the context of the user's semantic, episodic, and procedural memory (knowledge, experience, and skills).

The concept of CDM is analogous to modern technology installed in the instrument panels of aircraft. Data formerly displayed to pilots on a variety of separate instruments displaying one variable, for example artificial horizon, direction, altitude, climb rate, speed, fuel, etc., can now be displayed to pilots as computer-produced imagery in a single screen on the instrument panel. That practice and CDM are both intended to consolidate on a currently viewed computer monitor or, optionally in CDM, several monitors, as much relevant data as possible to aid the viewer in reasoning about next steps. In CDM software, the data relate to a set of text data objects and associated graphic images. The design criteria for the graphical user interface (GUI) of CDM software are fourfold, as follows. One, all permutations of automated CDM data tables must be examined to ensure that no important interrelations are overlooked; two, processes must maximize real time operation in view of, as taught by cognitive science, the limited duration in human memory of currently viewed data about which the software user is reasoning; three, the user should have immediately available, preferably imaged concurrently, as much information as possible about items being examined; and, four, the user must be able to rapidly edit viewed data to reflect her or his reasoning and, if desired, add color to text and/or backgrounds for later reference.

BRIEF SUMMARY OF THE INVENTION

The present invention, which is an improvement of the analytic methodology, CDM, described in the present inventor's prior U.S. Pat. Nos. 6,134,564 and 6,216,139, includes automated permutation of computer-produced data tables that list text data objects; an integrated dialog box for creating computer records of text data items to be listed on a data table, and for analysis of a plurality of such dialog boxes along with, if desired, associated graphic images; and concurrent imaging of a data table of text data items and associated images to include optional imaging of an integrated dialog box defined herein as a CDM item screen.

Automated permuting of a data table is described in U.S. Pat. No. 6,134,564. That operation becomes impractical when the number of parameters exceeds 5 or 6, which requires omitting some parameters from the user's view and, in turn, from her or his reasoning. The present invention enables display of any number of parameters while basing the permutation on a selected lesser number. The present invention also provides an integrated dialog box, or "item screen," that contains text data identified herein, including means to enter the digital address of an associated graphic file and also view said graphic file. Finally, the present invention provides for consolidating, in a choice of configurations, the imaging of the data table, an item screen, and graphic objects associated with items listed on the table. Such combined displays meet CDM design criterion number three specified above, namely that "the user should have immediately available, preferably imaged concurrently, as much information as possible about items being examined."

BRIEF DESCRIPTION OF THE DRAWINGS

FIG. 1 depicts a data table with specifying text data objects and values for identified parameters assigned to the text data objects, and the means to identify parameters for exclusion from the automated sorting process but remain visible.

DETAILED DESCRIPTION OF THE INVENTION

Figure 2:
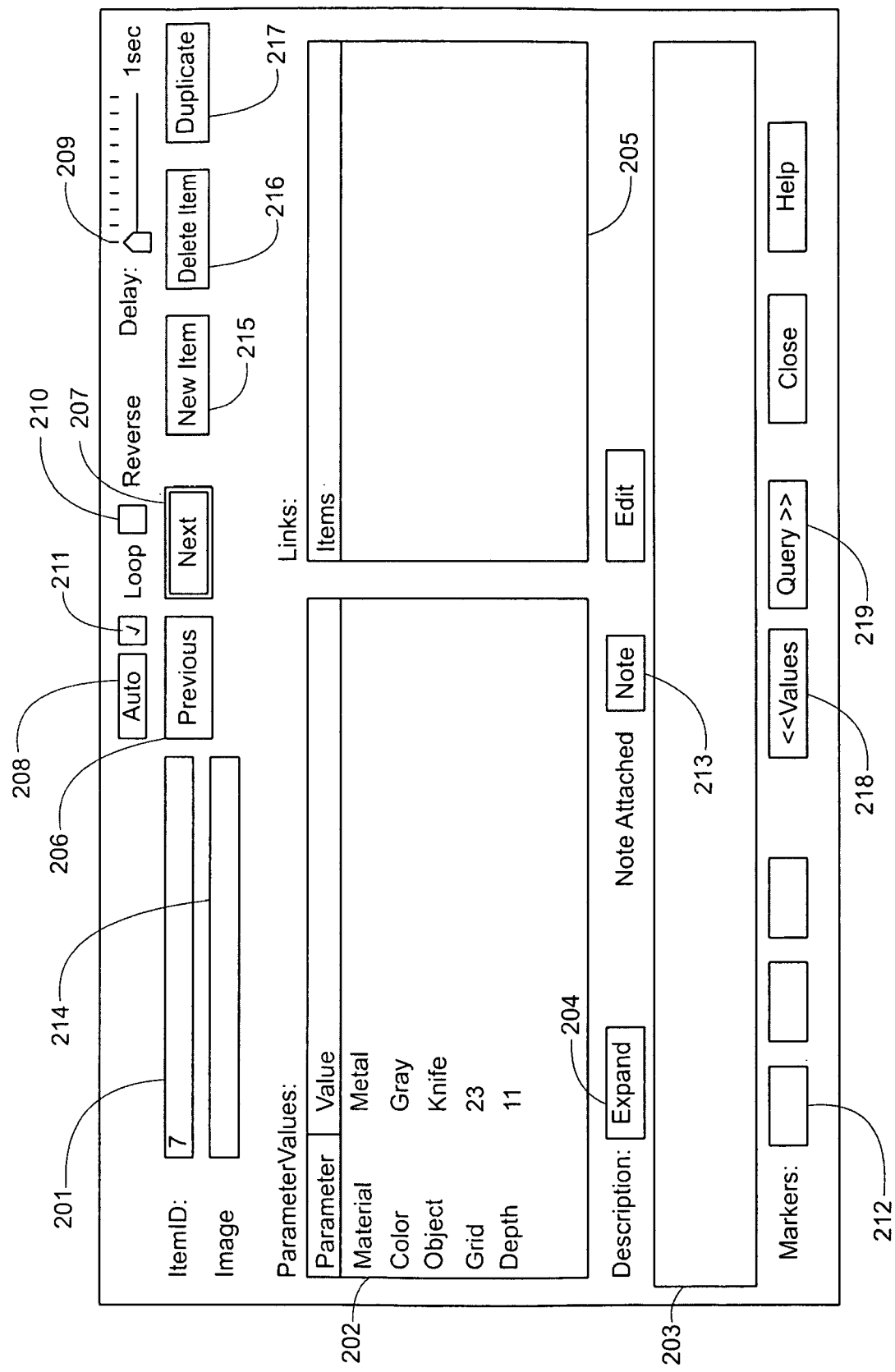
FIG. 2 is an integrated dialog box, called the item screen, imaged by clicking an item name on the data table depicted in FIG. 1.

The data table in FIG. 1 is a portion of the view screen depicted as FIG. 8 in the above-referenced U.S. Pat. No. 6,134,564. When the user of CDM software instructs the computer to automatically display, at a speed determined by the user, a sequence of permutations of the data table, the number of such permutations is determined by the number of parameters. For example, a table with 4 parameters can have 24 permutations, 5 parameters have 120 permutations, 6 parameters have 720 permutations, etc. On each new permutation of the table, the vertical and horizontal locations of parameter values and the vertical locations of the item names change location because of the different sort orders of each permutation. Employing a form of combinatorial reasoning, the user of CDM software examines all possible combinations of parameter values, and differing sequences of names, to find meaningful interrelations, actual or visualized. The user employs in-place editing and colorization of text and cells to reconcile the data on the table with his or her reasoning. It is obvious that examining all permutations may be practical when their number, determined by the number of parameters is 4, 5, possibly 6 but doubtfully practical with the 5,040 permutations possible with 7 parameters. Yet the user may want to maintain visibility of all parameters but limit permutation to a lesser number of parameters in order to obtain fewer permutations to examine. The present invention addresses that situation. By clicking (101) of the Locked boxes at the head of a desired parameter column, subsequent permutation of the data table will involve sorting only the parameters not so marked. In FIG. 1, therefore, instead of viewing 120 permutations of the 5 parameters, the user views only 24 but retains visibility of the values in the locked column.

Consistent with the objective of enabling the user to simultaneously perceive visually a plurality of sources of data about the items listed in a data table, the CDM concept addresses the integrated dialog box illustrated in FIG. 2. This item screen is used to enter item data, from which is selected a dataset for populating the data table, as well as to enter additional data for subsequent reference. Such an item screen is imaged when the user clicks the item name (102). The associated item screen, FIG. 2, includes the item name (201), the item's parameters and their values (202), a field for descriptive text (203) that can be expanded by clicking (204) to reveal a large quantity of text comprising more information about the item than its name and parameter values, optionally including observations entered during previous use. Another field (205) lists other items on the data table that have been selected as related items, the item screens of which can be accessed by clicking their names in this field. All the item screens in the dataset represented in the data table, FIG. 1, constitute a virtual stack of such screens. The user can instantly view them all sequentially by clicking the Previous (206) or Next (207) buttons, or by selecting automated sequencing by clicking Auto (208) and specifying the delay interval with the slider at (209). For continued perusal of the item screens the user can also elect to see them in reverse order by clicking the box at (210), and can also cause the sequence to loop by clicking (211). After the Auto mode (208) has been clicked, that word on the button is automatically replaced by the word Stop, which can be clicked to stop the automated sequencing.

A user rapidly browsing through a virtual stack of item screens can be aided by a visual sorting mechanism. In visual retrieval fields (212), the user can enter any character and/or color in one or all of the fields. The means of entering characters and affixing colors are known to those skilled in the art. While browsing the user may also wish to enter temporary small notes in a dialog box opened by clicking the Note button (213). Later, while sequencing the virtual stack of item screens, contents of the marker fields (212) aid visual retrieval, and the presence of a note is indicated when that item screen is imaged by the imaging of the phrase Note Attached preceding (213) and an audible sound when that screen is imaged.

The user can manipulate the content of the current virtual stack of items screens by adding a new item (215), deleting the current item being examined (216), or creating a duplicate item (217) when reasoning leads to the wish for a new item that is similar to the one being examined, said duplicate then being edited and renamed. Rather than being limited to reading item names and parameter values, or even the additional data that may be available in the description (203), the user is able to enter (214) the digital address of an associated file such as an application that opens a letter, photograph, map, website, or audio file. After entry, clicking the word Image preceding the field at (214) opens the file at that address.

Responsive to CDM design criteria number two regarding rapid operation, the user may either perform in-place editing or click (218) to open a dialog box with a drop-down list of the current parameters and their values from which a selection can be made. When this item screen is used to enter data for the final item to be listed on the data table, the user clicks (219) to image an integrated dialog box, as discussed in U.S. Pat. No. 6,216,139, in which the desired select and sort criteria are entered.

Figure 3:
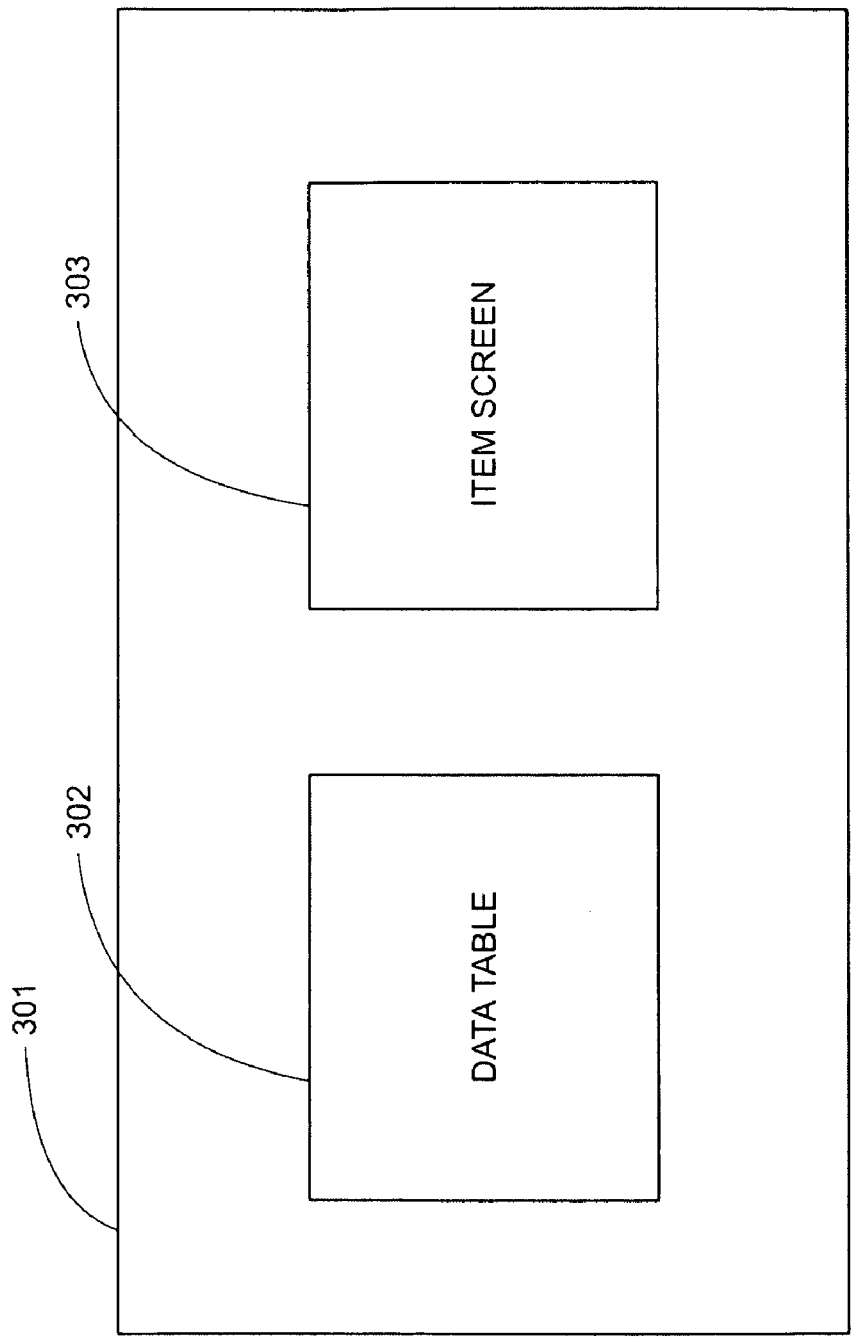
FIG. 3 depicts the simultaneous display of a data table and an item screen associated with one item listed in the data table.
Figure 4:
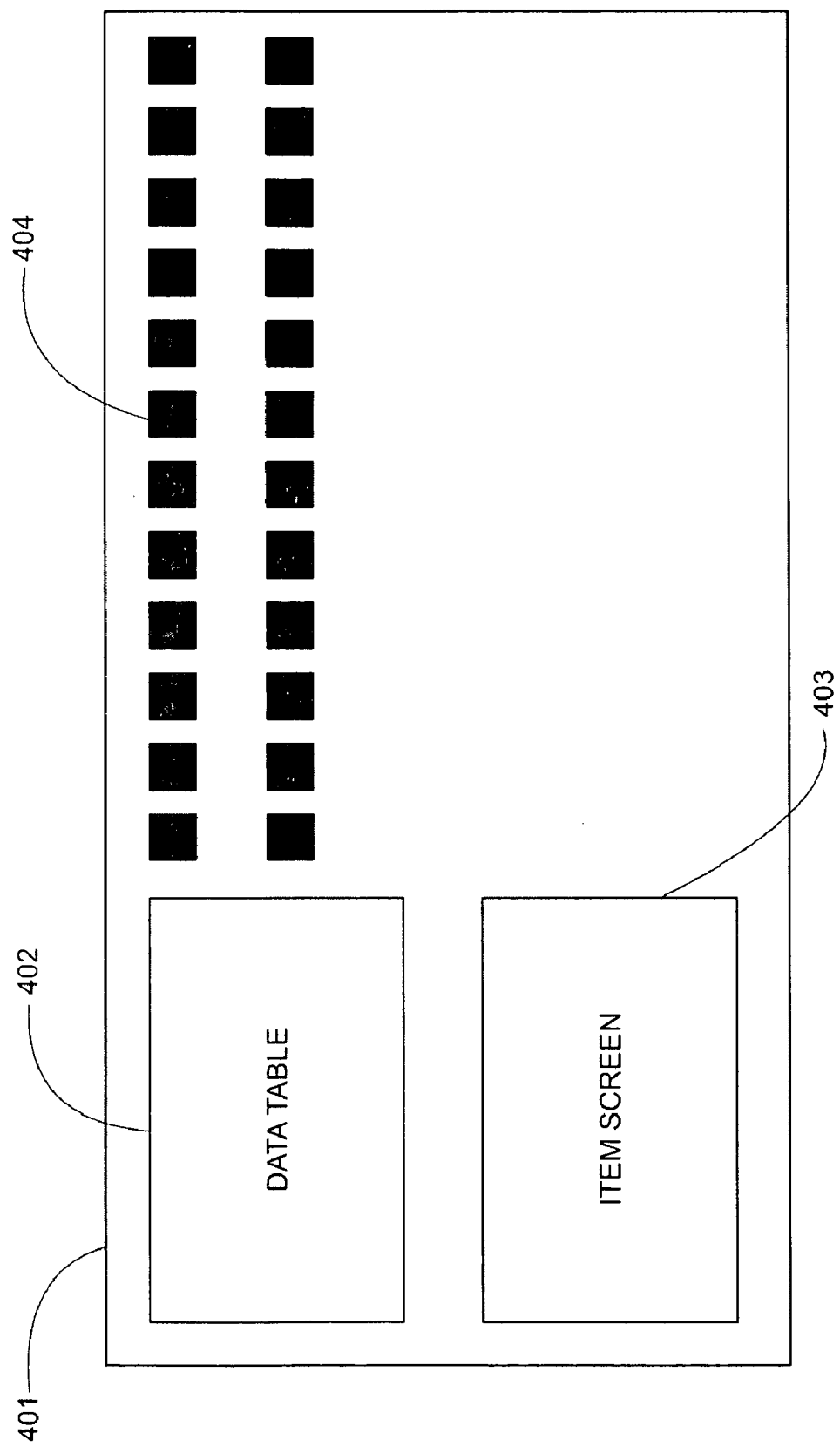
FIG. 4 depicts the simultaneous display of a data table, an item screen, and images associated with text data items listed in the data table.
Figure 5:
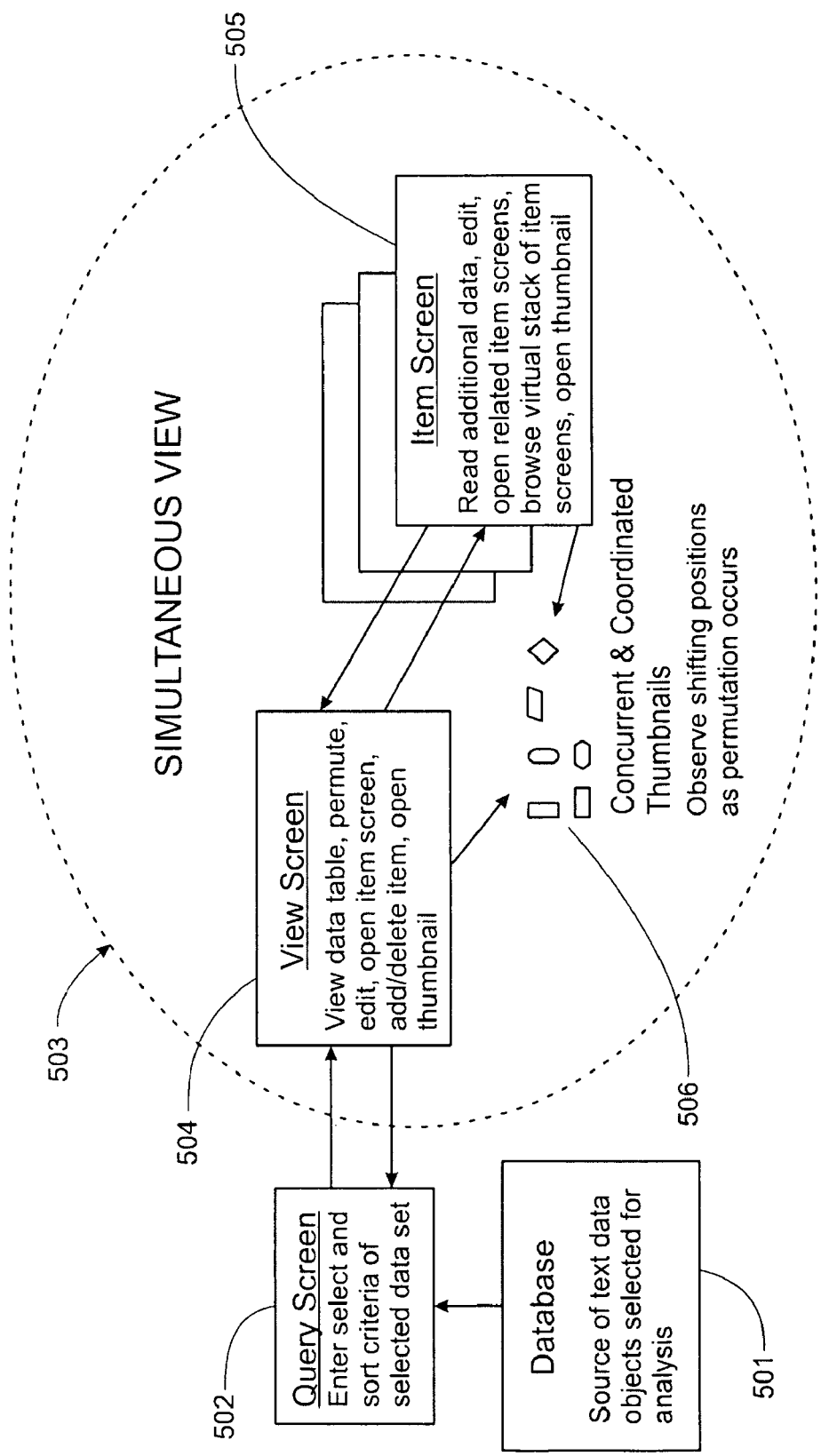
FIG. 5 depicts simultaneous viewing of a data table, a virtual stack of item screens, and associated "thumbnails" of items listed in the data table. Also shown are a database and integrated dialog box, called a query screen, that defines the dataset of selected items that are to be analyzed, as discussed in the present inventor's U.S. Pat. No. 6,216,139.

CDM design criterion number four calls for enabling the user to perceive simultaneously a plurality of sources of data about the items listed on a data table. Consequently, concurrent imaging of both the data table and associated item screen is depicted in FIG. 3. Shown on a wide screen monitor (301) is a view screen containing a data table (302) along with the item screen (303) opened by clicking an item name on the data table. It will be apparent that multiple physical locations of the two screens on the monitor can be chosen by the user. FIG. 4 shows a wide screen monitor displaying in addition to the view screen an item screen, and graphic images (404) displayed concurrently and coordinated with the location of the item names in the data table. Each of those small graphic images, commonly called "thumbnails", provides access to a file associated with an item listed in the data table. It will be apparent to those skilled in the art that a plurality of imaging options exist, such as multiple monitors, displaying adjacent to thumbnails the associated item names, even manipulating images displayed when a thumbnail is clicked. FIG. 5 amplifies FIG. 4 by adding the database and the query screen used to select the content of the dataset to be analyzed and the sort order for the resulting data table. FIG. 5 also adds brief summaries of user operations and encloses the three elements of FIG. 4 in a dotted oval.

In FIG. 5, the database (501) contains all records of text data objects from which the user can create a derivative smaller dataset using a query screen (502), as discussed in U.S. Pat. No. 6,216,139, to enter select and sort criteria that define the content of a data table. The oval boundary (503), which depicts the same imaging as in FIG. 4 but includes brief summaries of user operations, serves to emphasize the concentration of data made visible simultaneously to the user. The query screen (502) could, although not frequently employed while modeling the data, become the 4th element of a simultaneous view. The modeling operations of the view screen (504) with other CDM elements are depicted with two-way arrows depicting the shifting attention of the user. The item screen (505) has components discussed in both above-cited patents, while the present invention adds (214) means for entering the digital address of an associated image (506) and for viewing it as well.

What is claimed is:

1. A computer-implemented method for sorting and displaying a sequence of permutations of a table of data objects, said method comprising concurrently displaying, by a computer system, a data table containing a number of data objects, each with associated values of specified parameters, and an item screen, said item screen including parameter value information concerning a selected one of the data objects from the data table and user-manipulable controls for entering information concerning said selected one of the data objects, and references to related others of the data objects in the data table.

2. The computer-implemented method of claim 1, wherein the item screen further includes user-manipulable controls for manually or automatically sequencing through individual pages, each respective page associated with a respective one of the data objects in the data table, for each said individual page, presenting parameter value information for said respective data object.

3. The computer-implemented method of claim 2, wherein the item screen further includes user-manipulable controls for specifying a delay interval during automated sequencing of the individual pages.

4. The computer-implemented method of claim 2, wherein the sequencing is in forward or reverse order through the individual pages according to user input via the user-manipulable controls of the item screen.

5. The computer-implemented method of claim 2, wherein the sequencing continuously loops through the individual pages or not according to user input via the user-manipulable controls of the item screen.

6. The computer-implemented method of claim 1, further comprising concurrently displaying image representations of the data objects while displaying the data table and the item screen.

7. The computer-implemented method of claim 1 wherein the concurrent display of the data table and the item screen is via a single display unit.

8. A computer-implemented method, comprising automatically permutating a data table listing a plurality of data objects according to user-specified sorting criteria; and, for each permutation, displaying concurrently a sorted order of said data objects in said data table and a dialog box for analysis of records of said data objects in said data table, said dialog box including item screens for parameter value information concerning selected ones of the data objects from the data table, user-manipulable controls for entering information concerning said selected ones of the data objects, and user-manipulable controls for manually or automatically sequencing through item screens associated with the data objects in the data table.

9. The computer-implemented method of claim 8, further comprising displaying concurrently with the sorted order, images associated with the data objects in the data table.

10. The computer-implemented method of claim 8 further comprising, for each respective item screen presenting parameter value information for a respective data object when said respective data object is identified in said respective item screen.

11. The computer-implemented method of claim 10, wherein the dialog box further includes user-manipulable controls for specifying a delay interval during automated sequencing of the item screens.

12. The computer-implemented method of claim 10, wherein the sequencing is in forward or reverse order through the item screens according to user input via the user-manipulable controls of the dialog box.

13. The computer-implemented method of claim 10, wherein the sequencing continuously loops through the item screens or not according to user input via the user-manipulable controls of the dialog box.

14. The computer-implemented method of claim 8 wherein the concurrent display is via a single display unit.

15. The computer-implemented method of claim 8, wherein the permutations of the data table include query-selected parameters displayed but excluded from sorting by the user-specified sorting criteria.

16. The computer-implemented method of claim 8, wherein the dialog box includes means for entering an address of an associated file for a respective one of the data objects represented in the dialog box and for viewing said file.

17. A computer-implemented method, comprising permutating a data table having a number of data objects selected from a larger data set according to user-specified criteria, which criteria include prohibitions on parameters upon which to perform a permutation, and displaying concurrently a view of the data table resulting from said permutating and a dialog box configured to present information concerning parameter values for a selected one of the data objects in the data table, said dialog box including user-manipulable controls for entering information concerning said selected one of the data objects and user-manipulable controls for manually or automatically sequencing through item screens associated with the data objects in the data table.

18. The computer-implemented method of claim 17, wherein the dialog box includes areas for entering references to related others of the data objects in the data table.

19. The computer-implemented method of claim 17, further comprising concurrently displaying image representations of the data objects while displaying the view of the data table and the dialog box.

20. The computer-implemented method of claim 17 wherein the concurrent display is via a single display unit.

* * * * *